United States Patent [19]

Augustin

[11] Patent Number: 5,435,426
[45] Date of Patent: Jul. 25, 1995

[54] GUIDING DEVICE FOR A HAND SCANNER

[76] Inventor: Dietmar Augustin, Reisingerstr. 45, DW-8045 Ismaning, Germany

[21] Appl. No.: 22,704

[22] Filed: Mar. 1, 1993

[30] Foreign Application Priority Data

Feb. 28, 1992 [DE]  Germany .................. 42 06 275.6

[51] Int. Cl.⁶ ............................................. G06K 9/22
[52] U.S. Cl. ................. 192/116.5; 235/472; 358/473; 382/312; 250/566
[58] Field of Search ............... 192/116.5, 138, 143; 382/59, 65; 358/473, 497; 250/566; 235/472, 483, 484

[56] References Cited

U.S. PATENT DOCUMENTS

| | | | |
|---|---|---|---|
| 4,553,035 | 11/1985 | Malinsky et al. | 250/566 |
| 4,684,998 | 8/1987 | Tanioka et al. | 382/59 X |
| 4,721,859 | 1/1988 | Lewis | 250/566 |
| 4,758,732 | 7/1988 | Kyriakides | 250/566 |
| 4,831,459 | 5/1989 | Kimura | 358/473 |
| 4,860,377 | 8/1989 | Ishigaki | 382/59 |
| 4,959,871 | 9/1990 | Mori et al. | 382/59 |
| 4,996,775 | 3/1991 | Sass et al. | 358/473 X |
| 5,058,188 | 10/1991 | Yoneda | 382/59 |
| 5,239,759 | 8/1993 | Dudek | 358/473 X |
| 5,254,860 | 10/1993 | Yeh et al. | 250/566 |

FOREIGN PATENT DOCUMENTS

| | | | |
|---|---|---|---|
| 142967 | 5/1985 | European Pat. Off. | 382/59 |
| 3006579 | 8/1981 | Germany | 382/58 |
| 9105881 U | 10/1991 | Germany . | |
| 55-25151 | 2/1980 | Japan | 382/59 |
| 57-37972 | 3/1982 | Japan | 382/59 |

*Primary Examiner*—Richard M. Lorence
*Attorney, Agent, or Firm*—Robbins, Berliner & Carson

[57] ABSTRACT

The invention relates to a guiding device for hand scanners which makes it possible to use such scanners with straight guidance, with uniform applied pressure, with uniform scanning speed and defined overlapping of scanned columns. For this purpose, the device has a device block, comprising a longitudinal guide rail with a longitudinal guide slot, guided in which is a guide frame, on which a carriage is mounted displaceably perpendicularly with respect to the guide slot and has a clamp or similar device for a scanner, and comprising a drive for adjusting the guide frame.

6 Claims, 3 Drawing Sheets

FIG. 3A
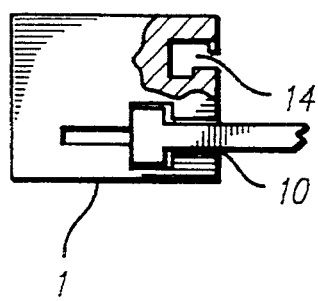
FIG. 3B
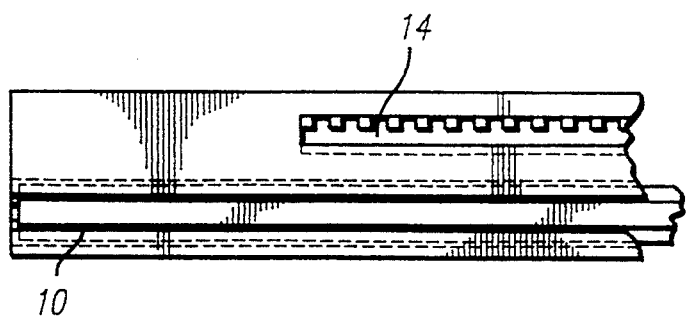
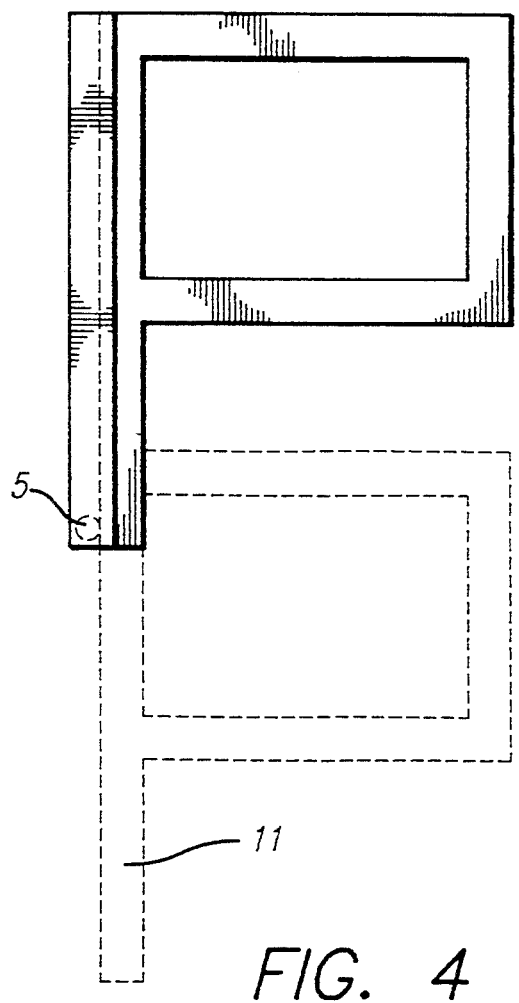
FIG. 4
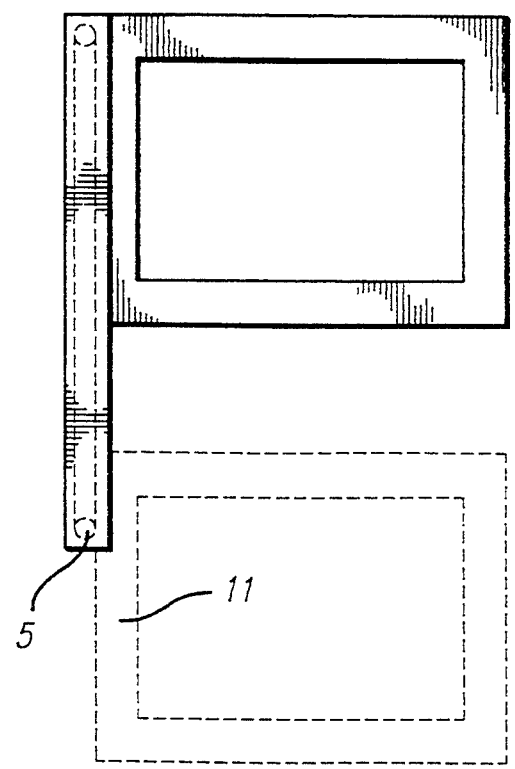
FIG. 5

GUIDING DEVICE FOR A HAND SCANNER

The invention relates to a guiding device for a hand scanner.

Scanners are used for the direct acquisition of graphics, images, documents etc. in a computer. In the case of most scanners currently available, the image original is illuminated and scanned line by line by light-sensitive elements. In order to obtain a complete image, either the original is taken past the recording elements or the original remains stationary and the recording elements are moved past it. The first type includes draw-in scanners, the second type includes flat-bed scanners and hand scanners.

The advantages of the hand scanner are its small dimensions and, in particular, its low price. Disadvantages occur due to the guidance by hand with regard to straight, rectangular guidance over the page to be scanned, uniform speed, uniform applied pressure and overlapping of about 10 cm when scanning at least two scanned columns.

DE-9105881 discloses a guiding device which has a longitudinal guide rail on which there is displaceably mounted a carriage which has a clamping means for the hand scanner.

U.S. Pat. No. 5,058,188 discloses a guiding device for a hand scanner which has a housing with a rectangular guide opening, in which the hand scanner is displaceably mounted in order to scan both a document and a scale.

The invention is based on the object of providing a guiding device of a simple design which permits the use of conventional hand scanners with regard to straight guidance, uniform applied pressure, uniform speed and overlapping.

This object is achieved according to the invention by the features specified in the defining part of claim 1. Expedient developments of the invention emerge from the subclaims.

The proposed design makes it possible to clamp hand scanners of conventional dimensions firmly in the guiding device and to carry out the scanning operation without any problems.

The invention is explained below by way of example with reference to FIGS. 1 to 6, in which:

FIG. 3 shows a cross-section and a side view of the longitudinal guide rail, FIGS. 4 and 5 show plan views of guiding devices with two different drives.

Figure 1:
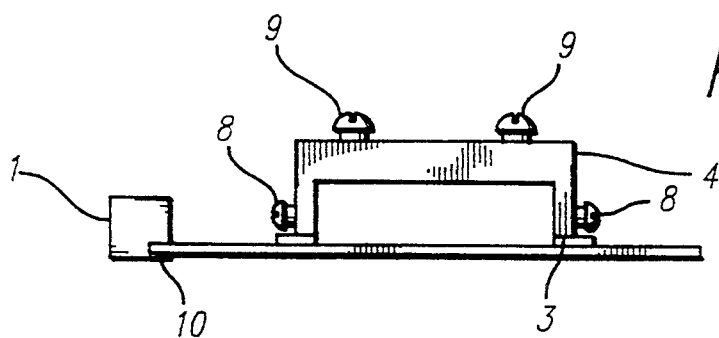
FIG. 1 shows an end view of the guiding device.
Figure 2:
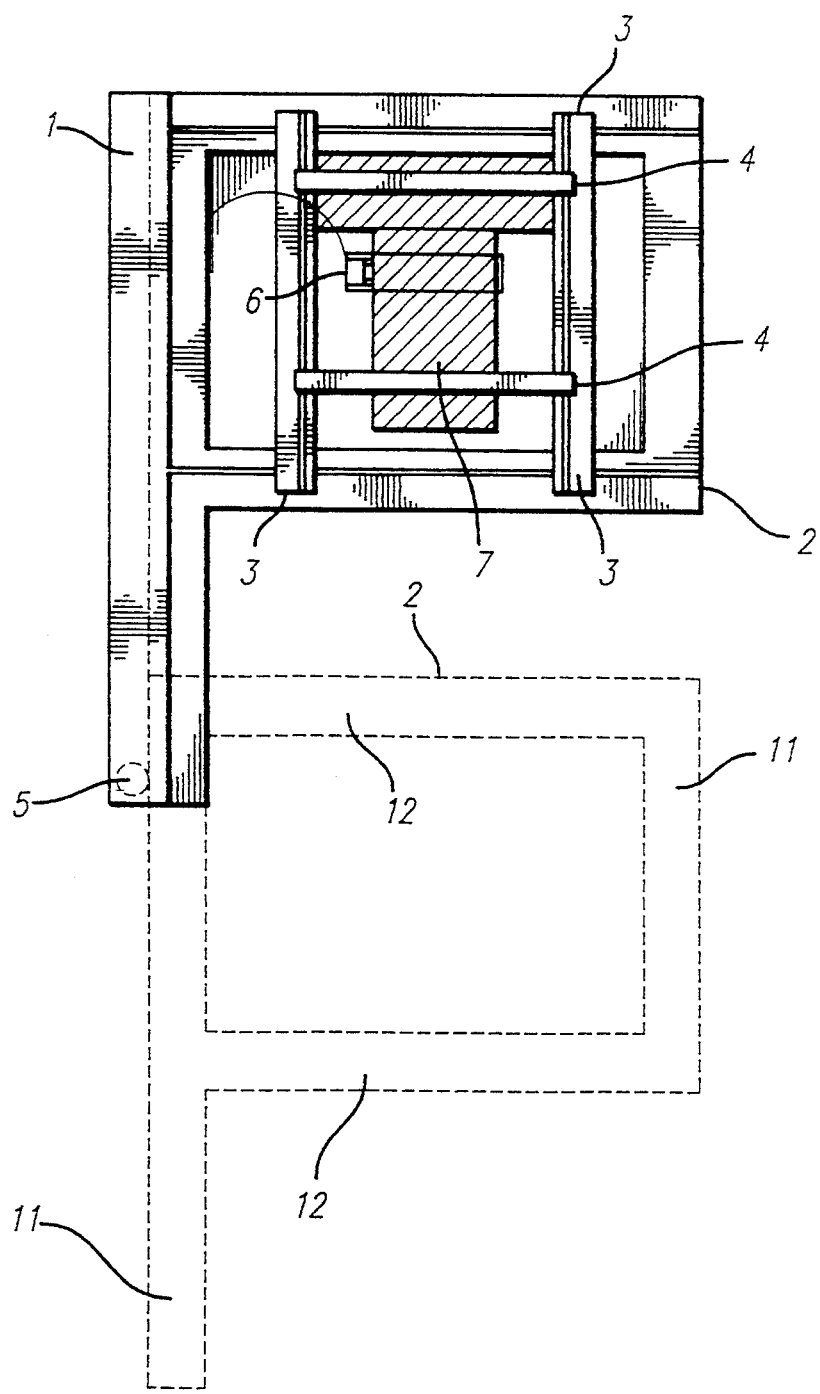
FIG. 2 shows a plan view of the guiding device in two positions of the guide frame.

The guiding device shown in FIGS. 1 and 2 has a device block having a longitudinal guide rail 1 with a slot 10, in which a guide frame 2 is mounted and can be adjusted by a drive 5. The guide frame 2 comprises two longitudinal arms 11 and two transverse arms 12, the longitudinal arm mounted in the longitudinal guide rail 1 being made longer than the other for reasons to be explained in more detail. Mounted on the guide frame 2 is a carriage which is mounted displaceably on the transverse arms 12 of the guide frame 2 perpendicularly with respect to the guide slot 10.

The carriage comprises two longitudinal rails 3, which are connected by transverse saddle brackets 4.

The transverse saddle brackets 4 have a clamping means for a scanner 7, which comprises two horizontal clamping screws 8 and two vertical clamping screws 9. The transverse saddle brackets 4 are able to be arrested by clamping screws (not shown) on the longitudinal rails 3 for adaptation to the dimensions of the scanner 7. The longitudinal rails 3 in turn are able to be arrested on the transverse arms 12 of the guide frame 2 by clamping screws (not shown), in order to avoid any displacement of the scanner transversely with respect to the longitudinal slot 10 during the scanning operation.

Arranged on the longitudinal guide rail 1 are two limit switches (not shown), by means of which the operation of the scanner 7, ie. switching it on and off, can be controlled. The limit switches are expediently arranged adjustably in the longitudinal direction and interact with stops (likewise not shown) on the guide frame 2. The limit switches may be mounted adjustably on a rod fastened on the longitudinal guide rail 1 or in a slot 14 of the longitudinal guide rail (FIG. 3).

The limit switches may be signal switches, which generate visual and/or acoustic signals, upon the triggering of which an operator can actuate the scanning switch 6 of the scanner 7 and thereby begin or end the scanning operation. It is also possible to couple the limit switches, for example mechanically, to the scanning switch 6.

FIGS. 4 and 5 show two possible ways of driving the guide frame 2. In the case of a rack-and-pinion drive, in which the drive pinion must be arranged at the lower end of the longitudinal guide rail 1, the guiding device has a greater space requirement in the longitudinal direction, since the longitudinal arm 11 of the guide frame 2, guided in the longitudinal rail 1, must be in engagement with the drive 5 when the frame 2 is in the starting position, as FIG. 4 reveals. In the case of a control-chain drive, the space requirement of the guiding device is less, since the corresponding longitudinal arm 11 of the guide frame 2 is in drive connection via the control chain in every position.

Figure 6:
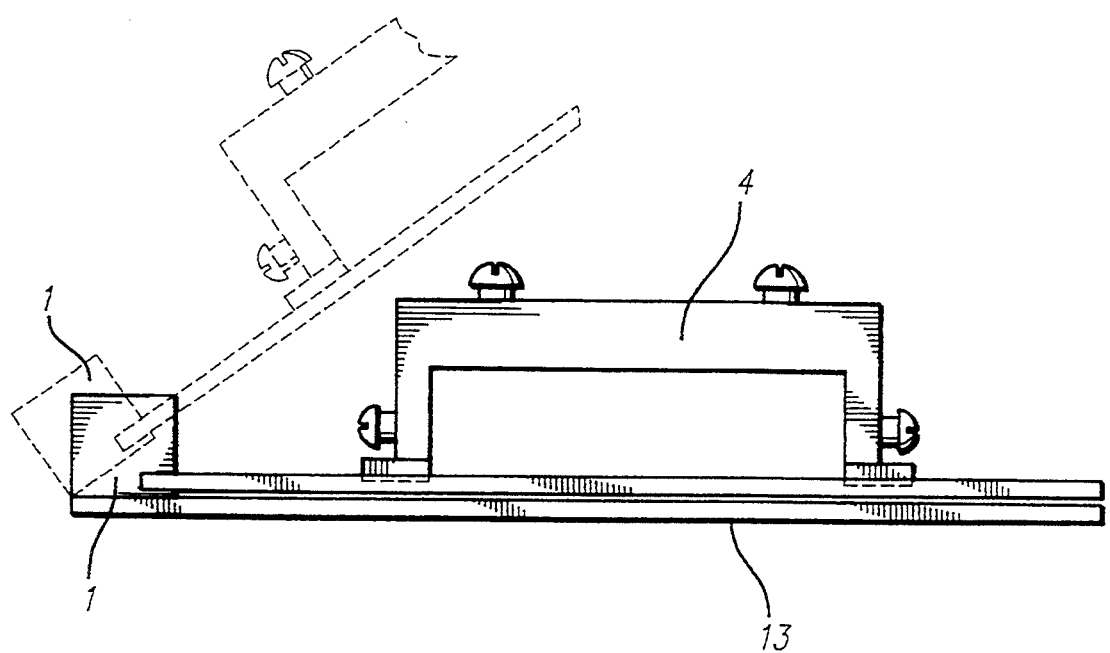
FIG. 6 shows an end view of a guiding device in a further embodiment.

FIG. 6 shows an embodiment in which the complete device block is pivotally arranged on a base plate 13. For loading an original to be scanned, the device block is brought into the pivoted position diagrammatically shown.

I claim:

1. A guiding device for a hand scanner, comprising a longitudinal guide rail with a guide slot in which is guided a guide frame including two longitudinal arms and two transverse arms, on which a carriage having clamping means for a hand scanner, two longitudinal rails which can be arrested on the guide frame by clamping means and two transverse saddle brackets mounted in such a way that they can be displaced and arrested by clamping means on the longitudinal rails is mounted in such a way that it can be displaced and arrested perpendicularly with respect to the guide slot, and a drive for adjusting the guide frame.

2. The guiding device as claimed in claim 1, wherein the transverse saddle brackets have horizontal and vertical clamping screws for firmly clamping the scanner.

3. The guiding device as claimed in claim 1, which comprises a rack-and-pinion drive for driving the guide frame.

4. The guiding device as claimed in claim 1, which comprises a control-chain drive for driving the guide frame.

5. The guiding device as claimed in claim 1, further comprising a base plate, on which the guide rail is pivotally mounted.

6. Apparatus for scanning an image, comprising:
scanning means; and
a guiding device for the scanning means, comprising a longitudinal guide rail with a guide slot in which is guided a guide frame including two longitudinal arms and two transverse arms, on which a carriage having clamping means for the scanning means, two longitudinal rails which can be arrested on the guide frame by clamping means and two transverse saddle brackets mounted in such a way that they can be displaced and arrested by clamping means on the longitudinal rails is mounted in such a way that it can be displaced and arrested perpendicularly with respect to the guide slot, and a drive for adjusting the guide frame.

* * * * *